March 24, 1959  W. STRAUSS  2,878,515
VALVED GATES FOR AN INJECTION MOLDING PRESS
Filed Nov. 1, 1954  2 Sheets-Sheet 1

INVENTOR.
William Strauss
BY
ATTORNEYS

March 24, 1959 W. STRAUSS 2,878,515
VALVED GATES FOR AN INJECTION MOLDING PRESS
Filed Nov. 1, 1954 2 Sheets-Sheet 2
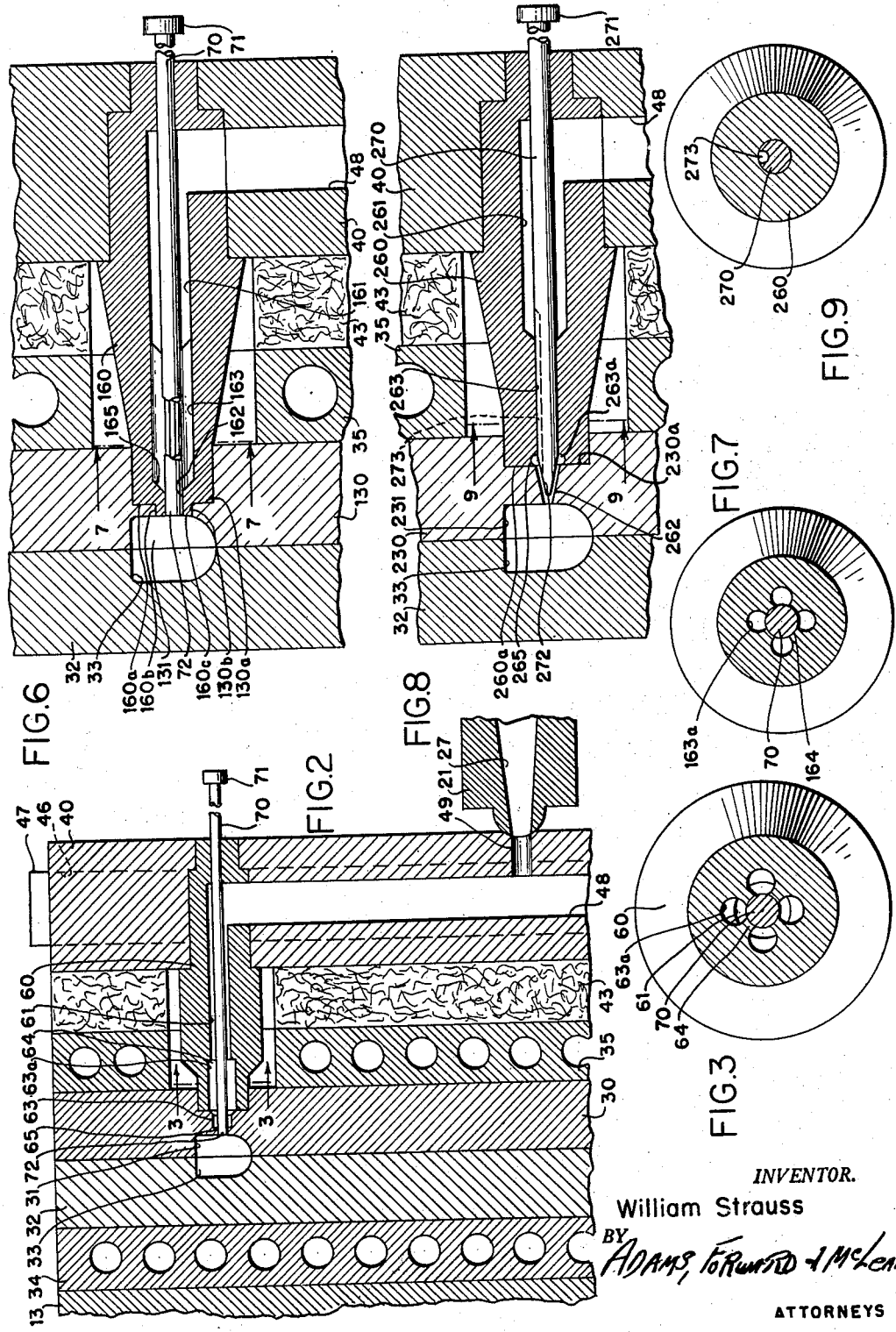
INVENTOR.
William Strauss
ATTORNEYS

С

United States Patent Office 2,878,515
Patented Mar. 24, 1959

2,878,515

VALVED GATES FOR AN INJECTION MOLDING PRESS

William Strauss, Philadelphia, Pa., assignor to F. J. Stokes Corporation, a corporation of Pennsylvania Application November 1, 1954, Serial No. 467,201

6 Claims. (Cl. 18—30)

My invention relates to injection molding, and, in particular, relates to an apparatus in which a molding material in a heated, plastic or molten state is injected into a heated chamber from which it is passed to a cooled die cavity insulated from the heated chamber through a channel which passes through the insulation and in which the channel is provided with a valve located in the proximity of the die cavity to seal communication between the heated chamber and die cavity between the periodic injections of fluent molding material into the heated chamber. Such an injection molding press is more completely described in my copending application Serial No. 396,660, filed December 7, 1953, now Patent No. 2,828,507, of which the present application is a continuation-in-part.

A practical construction for providing the necessary valving action, as is disclosed in my copending application, is a pin valve which extends slidably within the channel which communicates between the die cavity and the heated chamber to seal the channel at its entry into the die cavity preferably with a flush fit, thus avoiding the necessity of sprue formation and subsequent irregularity on the surface of the molded article. The pin, of course, need not be brought to a flush fit with the interior of the die cavity where a projection or depression are required at the gate location.

In such a construction the tip of the pin valve is withdrawn from its sealing position at the die cavity end of the channel during the injection stroke to admit passage of fluent, heated molding material from the interior of the heated chamber through the channel into the die cavity. Because the channel defining member which extends through the insulation between the heated chamber and mold is in contact with both the heated chamber and the cooled mold, there is a tendency for material retained in the channel behind the seal to solidify during the interval in which the injected material is cooled within the die cavity and in which the molded article is ejected from the die cavity. Thus when the pin valve is withdrawn during the subsequent injection stroke, its tip must be pulled back clear of any such solidified material in order to permit passage of fluent molding material into the die cavity.

It is, however, desirable to make the pin valve stroke as short as possible in order to provide maximum mold separation space. It is, moreover, disadvantageous to have solid molding material present in the channel during the injection stroke which the flow of fluent molding material into the die cavity can loosen and force into the channel toward the die cavity. This frequently can jam the channel preventing a full charge from being delivered into the die cavity and damaging the tip of the sealing pin upon its return stroke to a closed position.

It is the principal object of this invention to provide a channel construction for use with pin valve members which will insure clean delivery of fluent molding material through the channel and prevent dislodging of solidified molding material formed in the channel back of the seal while the pin valve member seals the channel.

For a more complete understanding of the principles of my invention reference is made to the appended drawings in which:

Figure 2 is an enlarged vertical sectional fragmentary view of the channel construction in Figure 1 illustrating a sealing pin in closed position;

Figure 3 is a cross-sectional view of the channel construction taken at line 3—3 in Figure 2;

Figure 6 is a fragmentary vertical sectional view illustrating another channel construction according to my invention;

Figure 7 is a cross-sectional view of the channel construction shown in Figure 6 taken at line 7—7 in Figure 6;

Figure 8 is a fragmentary vertical sectional view illustrating yet another channel construction according to my invention; and Figure 9 is a cross-sectional view of the channel construction shown in Figure 8 taken at line 9—9 in Figure 8.

Figure 1:
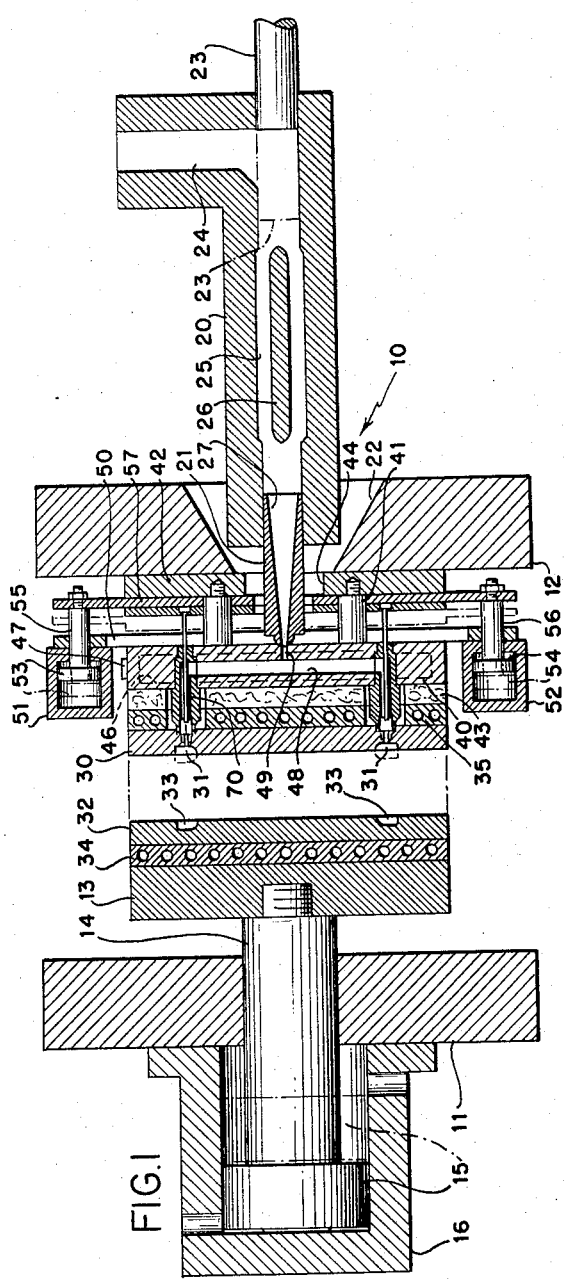
Figure 1 is a vertical sectional view taken through an injection molding press having a heated chamber interposed between the injection nozzle and die cavity which includes the channel construction of my invention showing the sealing pins in open position.

Referring particularly to Figure 1 injection molding press 10 includes a rigidly mounted abutment 11 and a fixed platen 12. A movable platen 13 is rigidly fixed to main power ram 14 which slidably passes horizontally through abutment 11 and terminates in piston 15 which is slidable within a hydraulic cylinder 16 rigidly fixed on the outer face of abutment 11. Suitable hydraulic means (not shown) are employed to reciprocate piston 15 horizontally within cylinder 16 thus causing movable platen 13 to reciprocate horizontally within the space between abutment 11 and fixed platen 12.

An injection device 20 terminating in an injection nozzle 21 extends through an aperture 22 in the rear face of fixed platen 12. Injection device 20 is provided with a hydraulically powered piston 23 which moves from the position shown in solid lines to the dotted-line position under externally supplied hydraulic pressure to deliver a charge of molding material in a somewhat fluid state from preheating chamber 24 to final heating chamber 25 which is provided with a mandrel heating device 26 and which communicates at its remote end with a tapered channel 27 through nozzle 21.

The inner face of fixed platen 12 supports a fixed die plate 30 which contains die cavities 31. These are positioned to align with corresponding die cavities 33 on a cooperating movable die plate 32, which is backed up by a rigidly attached cooling plate 34 containing passages for the flow of liquid coolant and which is rigidly secured to horizontally reciprocable platen 13. Die plate 30 is similarly backed up with a rigidly attached cooling plate 35 similarly provided with passages for flow of liquid coolant and is rigidly attached by mounting pins (not visible) to chambered plate 40 being spaced a short distance therefrom. Chambered plate 40 in turn is supported upon horizontal pins 41 which are rigidly affixed to plate 42 which is in turn rigidly affixed to the inner face of fixed platen 12. A layer of insulating material 43 is interposed between cooling plate 35 and chambered plate 40 to minimize heat loss by radiation from plate 40 to plate 35.

Plate 42 is provided with a central aperture 44 which aligns with aperture 22 in fixed platen 12 and through which injection nozzle 21 extends up to a position in which the tip of the nozzle 21 abuts chambered plate 40. Chambered plate 40 is provided with several vertical passages 46 which receive electrical resistance heating elements 47 and is provided with a central chamber 48. A horizontal passageway 49 in chamber 40 communicates between chamber 48 and the abutting tip of nozzle 21 registering with the opening from passage 27 in nozzle 21.

An open-centered crosshead 50 is secured to the face of chambered plate 40 remote from die plate 30 and carries a cylinder 51 positioned above chambered plate 40 and a cylinder 52 positioned beneath chambered plate 40. Cylinders 51 and 52 contain horizontally reciprocable pistons 53 and 54, respectively, to which are affixed piston rods 55 and 56, respectively. Piston rods 55 and 56 slidably extend horizontally through crosshead 50 terminating between crosshead 50 and fixed platen 12 supporting between them at their terminal ends a yoke 57 which is mounted in sliding engagement on pins 41 for horizontal reciprocation within the space between crosshead 50 and plate 42. Cylinders 51 and 52 are provided with suitably hydraulic means (not shown) for producing simultaneous reciprocation of pistons 53 and 54 to reciprocate yoke 57.

Referring more particularly to Figure 2, a bushing 60 is mounted on chambered plate 40 aligned with each of die cavities 31 projecting inwardly from chambered plate 40 toward die plate 30 through suitable apertures in insulation 43 and cooling plate 35 up to and abutting die plate 30, suitably received by die plate 30 to insure mechanical stability. Each bushing 60 is provided with a central passage 61 which communicates with chamber 48 at one end and which extends at its other end through die plate 30 into die cavity 31.

An elongated pin 70 enters the outer face of chambered plate 40 in fluid-tight sliding engagement therewith and extends through channel 61 up to die cavity 31. The terminal end 71 of pin 70 is affixed to and carried by yoke 57 such that horizontal reciprocation of yoke 57 will cause horizontal reciprocation of pin 70 within channel 61. The tip 72 of pin 70 can thus be positioned flush with the inner face of die cavity 31 as shown in Figures 2 and 5, it can be extended through die cavity 31 to perform knock-out functions, and it can be withdrawn partially up channel 61 in the position indicated in Figures 1 and 4, for example.

Figure 5:
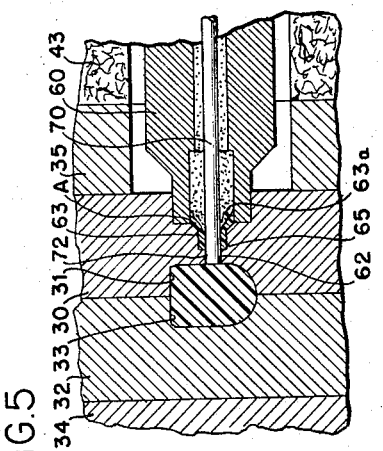
Figure 5 is also a fragmentary vertical sectional view illustrating the closed position of a sealing pin after injection.
Figure 4:
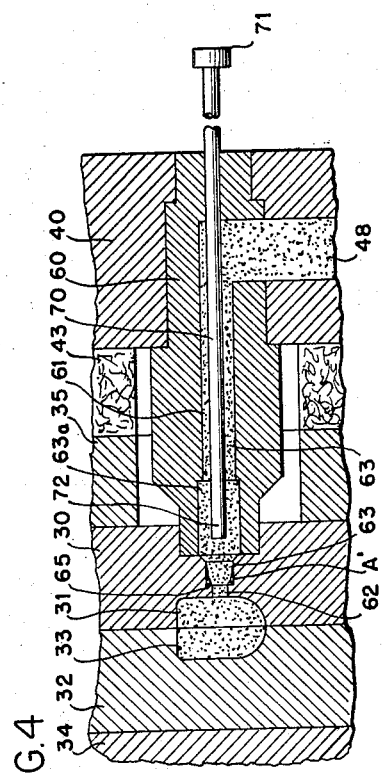
Figure 4 is a fragmentary vertical sectional view of the channel construction of my invention showing a sealing pin retracted during an injection stroke illustrating the flow of fluent molding material past the solid molding material accumulated in the channel.

Channel 61 where it enters die cavity 31 is constricted as indicated most clearly at 62 in Figures 2, 4 and 5 to provide a snug, fluid-tight, sliding fit for tip 72 of pin 70. Immediately back of constricted portion 62 of channel 61, channel 61 is formed with an enlarged portion 63 of considerably greater cross-sectional area than the cross-sectional area of pin 70. This enlarged portion extends back through channel 61 to chamber 48 to admit passage of fluent molding material about pin 70 when pin 70 is withdrawn from sliding engagement in constricted portion 62 of channel 61.

The enlarged portion 63 of channel 61 intermediate of its length is divided into four longitudinal channels 63a separated by longitudinal bosses 64 which extend radially inwardly into sliding contact with pin 70 forming a guide for tip 72 so that as pin 70 is reciprocated toward constricted portion 62 of channel 61 it is guided into a smooth sliding fit and is prevented from catching on shoulder 65 which abruptly marks the transition from enlarged portion 63 of channel 61 into constricted portion 62 of channel 61.

While channel 61 might have been constructed with a tapered fit from enlarged portion 63 to constricted portion 62, thus obviating the need for any guide flange 64, the employment of abrupt shoulder 65 surrounding the constricted portion 62 provides a setback around constricted portion 62 on which fluent molding material, which solidifies in channel 61 during the cooling and ejection operations, catches and is prevented from being forced into constricted portion 62 during subsequent injection, as is more fully described hereinafter with reference to Figures 4 and 5.

In operation press 10 is closed by reciprocating piston 15 to cause die plate 32 to abut die plate 30 with die cavities 31 and 33 aligned. At this point pistons 53 and 54 are in retracted position with tips 72 of pins 70 extended into constricted portions 62 of channels 61 in a flush fit with the interior of die cavities 31. Plunger 23 is retracted in the solid-line position shown in Figure 1 with chamber 24 loaded with a freshly supplied charge of pre-heated pulverant molding material. Chamber 25, nozzle 27, chamber 48 and channel 61 contain heated, fluent molding material.

Piston 23 is then reciprocated toward its dotted-line position shown in Figure 1 forcing molding material from chamber 25 through nozzle 27 into chamber 48. Immediately after piston 23 starts to build up pressure in confined chamber 48, pistons 53 and 54 are reciprocated to the solid-line positions, reciprocating pins 70 to the position shown most clearly in Figure 4 in which they are substantially withdrawn into enlarged portion 63 of channel 61 admitting fluent molding material through passages 63a past shoulder 65 and through constricted portion 62 into die cavity 31—33, the cavity then being filled with fluent molding material as shown in Figure 4.

Thereafter pistons 53 and 54 are retracted to the dotted-line position moving pins 70 back into a flush fit with the inner surface of die cavities 31, as indicated most clearly in Figure 5, sealing off communication of channel 61 with die cavity 31—33. Piston 23 is then retracted to the solid-line position shown in Figure 1 and the fresh charge of molding material from preheating chamber 24 drops into position in chamber 25 for the next injection stroke. Suitably at this point a fresh charge of pulverant molding material is placed in chamber 24.

The mold is retained closed for a period of time sufficient to allow the charge of fluent molding material in die cavity 31—33 to solidify as indicated in Figure 5.

By reason of the abutting contact of bushing 60 and die plate 30 and also by reason of the fact that part of the enlarged portion 63 of channel 61 lies in die plate 30, there is a tendency for solidification of fluent molding material in channel 61 to take place as indicated at A in Figure 5. When the molded article has been ejected in the conventional manner and pin 70 is withdrawn to admit a fresh charge of fluent molding material into die cavity 31—33 the solidified material formed at A in the enlarged portion 63 of channel 61, immediately back of constricted portion 62, tends to be loosened and forced into opening 62 except for shoulder 65 which retains the material and prevents it from loosening and passing into the die cavity. During the injection, of course, the solidified material at A tends to refluidize because of the heat contained in the fresh fluent molding material passing through channel 61, and its volume will be considerably reduced by the end of the injection stroke as indicated at A' in Figure 4. Even so reduced, the remaining solidified molding material in channel 61 is held in place by shoulder 65, and jamming of constricted portion 62 of channel 61 is thereby prevented. It will also be noted in Figure 4 that during the injection the solidified molding material indicated at A' melted away at shoulder 65 immediately about the opening into constricted portion 62 of channel 61. Thus at the end of the injection stroke as each pin 70 is reciprocated to insert tip 72 into constricted portion 62, a space is provided about the opening into constricted portion 62 which allows excess fluent molding material ahead of tip 72 to back up around pin 70. The force required to reciprocate pins 70 to seal off die cavities 31—33 is thus substantially reduced, and the point of operation at which the seal is obtained and the volume of fluent molding material forced into die cavities 31—33 by the closing action of pins 70 are fixed from one cycle to the next.

Referring to Figure 6, I have illustrated a fragmentary view of the press shown in Figure 1 employing another channel construction in accordance with my invention. In Figure 6 and in Figure 7 which is a cross section of the same channel construction, and in Figures 8 and 9 which show yet another channel construction, the same reference numerals as in Figures 1–5 have been employed where the parts are identical to those shown in the previous construction.

In Figures 6 and 7 bushings 60 have been replaced by new bushings 160 and die plate 30 has been replaced by die plate 130. A bushing 160 is mounted on chambered plate 40 aligned with each of die cavities 131 defined in die plate 130 and projects inwardly from chambered plate 40 toward die plate 130 through suitable apertures in insulation 43 and cooling plate 35. Near its end at die plate 130 each bushing 160 is provided with an external annular shoulder 160a which abuts a complementary annular recess 130a in the rear face of die plate 130. A central projection 160b extends into die plate 130 with its end face 160c defining a portion of the inner surface of die cavity 131.

Each bushing 160 is provided with a central passage 161 which communicates with chamber 48 at one end and extends at its other end through the noted projection 160b opening into end face 160c, and thus provides a communication between chamber 48 and die cavities 131—33.

Pins 70, as before, enter the outer face of chamber plate 40 in fluid-tight sliding engagement therewith and extend through a channel 161 up to die cavity 131. The tip 72 of each pin 70 can be positioned, as before, flush with the inner face of its respective die cavity 131, it can be extended through die cavity 131 and it can be withdrawn partially up channel 161.

Channel 161 as it extends through projection 160b into die cavity 131 is constricted as indicated by the reference numeral 162 to provide a snug, fluid-tight sliding fit for tip 72 on pin 70. Immediately back of constricted portion 162, channel 161 is enlarged to a greater diameter extending back into chamber 48. The reference numeral 163 indicates the enlarged portion of channel 161. Enlarged portion 163 of channel 161 is separated from constricted portion 162 by a sharp, sloping shoulder 165 which performs the functions of shoulder 65 in the construction referred to in Figures 1–5. Starting at shoulder 165 and extending partially along channel 161 toward chamber 48 the enlarged portion 163 of channel 161 is divided into four longitudinal cylindrical channels 163a, shown most clearly in Figure 8. Channels 163a are separated by longitudinal bosses 164 which extend radially inwardly into sliding contact with pin 70 and enter smoothly into constricted portion 162 of channel 161 to guide reciprocation of pin 70 into a smooth sliding fit with constricted portion 162.

The operation of the device shown in Figures 6 and 7 is substantially the same as the operation shown in Figures 1–5. It will be noted, however, that in bringing channels 163a up to shoulder 165, it is essential that the axis of each channel 163a be positioned radially outward from the surface of pin 70 such that the cylindrical section of each channel 163a which is open toward the center of channel 161 is less than a semi-cylinder. By this means bosses 164 aid in preventing solid molding material which forms in channel 163a during the curing operation from collapsing and falling into the opening created when pin 70 is subsequently withdrawn during the next injection stroke. In the device of Figures 1–5 the complete uninterrupted annular space back of shoulder 65 kept the solidified material in one piece so that it could not fall into the channel when pin 70 was withdrawn.

Figures 8 and 9 show yet another channel construction employing a bushing 260 projecting inwardly from chambered plate 40 toward die plate 230 aligned with die cavity 231. Bushing 260, like bushings 60 and 160, extends through suitable apertures in cooling plate 35 and insulation 43. The end 260a of bushing 260 abuts an annular recess 230a in the rear face of die plate 230 which extends about a central opening 262 extending from the rear face of die plate 230 into the interior of die cavity 231 defined in die plate 230. Channel 262 is tapered to a very small gate entering die cavity 231.

Bushing 260 is provided with a central channel 261 which communicates between chamber 48 in chambered plate 40 and channel 262. The portion 263 of channel 261 at its end entering channel 262 has substantially the same diameter as the wide end of channel 262 which it enters. The end of channel 261 entering chamber 48 has a substantially increased cross-section. At the transition between narrow portion 263 of channel 261 into channel 262 there is formed a small annular space 263a of enlarged total cross-section, which is separated from channel 262 by an abrupt annular shoulder 265.

An elongated pin 270 enters the outer face of chambered plate 40 in fluid-tight sliding engagement therewith and extends through channel 261 up through channel 262 to die cavity 231. The terminal end of 271 of pin 270 is affixed to and carried by yoke 57 such that horizontal reciprocation of yoke 57 will cause horizontal reciprocation of pin 270 within channel 261. The tip 272 of pin 270 is tapered to provide a smooth, fluid-tight fit in tapered channel 262 when pin 270 is reciprocated into its extreme position toward die cavity 231. Reciprocation in the reverse direction retracts tip 272 back toward, but not into, the enlarged portion of channel 260. Pin 270 is further provided with a longitudinal groove 273 which extends from its tapered portion 272 into the enlarged portion of channel 261 when the tapered portion 272 is in sealing contact with channel 262.

In operation during the injection stroke pin 270 is withdrawn with its tip 272 toward the enlarged portion of channel 261 to admit flow of fluent material through channel 261 along groove 273 into channel 262 and into die cavity 231—33. At the end of the injection stroke pin 270 is reciprocated to bring tip 272 into sealing contact with channel 262. Groove 273 permits excess fluent molding material in front of tip 272 to escape back into channel 261. During the curing operation the fluent molding material remaining in annular space 263a solidifies up partially into groove 273. Upon the next injection stroke as pin 270 is retracted, the solidified material in annular space 263 restrains the solidified material in groove 273 and keeps it from being pulled back with pin 270 thus opening the orifice formed by groove 273 to permit fresh fluent molding material to be injected into die cavity 231—33.

I claim:

1. In an injection molding press, including a mold, a die cavity within said mold, cooling means for said mold, injection means including a nozzle for injecting a charge of fluent molding material into said die cavity, means defining a chamber, heating means for said chamber, an aperture in said chamber to which said nozzle is connected, a channel communicating said chamber and said die cavity, a pin valve member independent of said injection means slidably extensible through said channel from a first position in which the tip of said pin member is withdrawn in said channel away from said mold to permit molding material to flow through said channel to a second position in which said pin member seals said channel, and means operable in timed relation with said injection means to operate said pin member in said channel between said first and second positions; the improvement which includes a short constricted portion in said channel immediately adjacent said die cavity, the tip of said pin when said pin member is in said second position being in sealing contact with said constricted portion and defining a portion of the surface of said die cavity and the tip of said pin member being withdrawn from said constricted portion when said pin member is in said first position, an enlarged portion in said channel immediately adjacent said constricted portion of said channel, a shoulder in said channel defining the transition between said enlarged portion and said constricted portion, guide means disposed in said channel between said constricted portion and said chamber slidably receiving said pin member to guide said pin member in movement between said first and second positions, and means defining a passageway between said channel and said guide means to admit flow of fluent material in said channel through said passageway past said guide means whereby molding material solidified in said enlarged portion about said pin member when said pin member is in said second position, upon withdrawal of said valve member to said first position is retained by said shoulder and thereby prevented from being carried in solid form into said constricted portion of said channel by subsequent flow of fluent molding material through said channel.

2. The improvement according to claim 1 in which said constricted portion of said channel receives the tip of said pin valve member in sliding engagement at said second position.

3. The improvement according to claim 1 in which said guide means and said passageway are defined by a plurality of bosses extending longitudinally in said enlarged portion of said channel.

4. The improvement according to claim 3 in which said bosses are positioned in the enlarged portion of said channel spaced from said constricted portion.

5. The improvement according to claim 3 in which said bosses are positioned in the enlarged portion of said channel extending to a position adjacent said constricted portion.

6. The improvement according to claim 1 in which said pin valve member is provided with a tapered tip and said constricted portion of said channel is tapered to receive said tip of said pin valve member in fluid-tight abutting contact in said second position of said pin valve member, and in which said passageway is a longitudinal groove along the outer surface of said pin valve member extending from the tapered tip thereof toward said chamber past said guide means when said valve is in said second position.

References Cited in the file of this patent

UNITED STATES PATENTS

| | | |
|---|---|---|
| 2,318,031 | Tucker | May 4, 1943 |
| 2,480,838 | Caron | Sept. 6, 1949 |
| 2,505,540 | Goldhard | Apr. 25, 1950 |
| 2,770,011 | Kelly | Nov. 13, 1956 |

FOREIGN PATENTS

| | | |
|---|---|---|
| 498,653 | Great Britain | Jan. 11, 1939 |
| 962,727 | France | Dec. 12, 1949 |